(No Model.)

G. W. WILLIAMS.
JOURNAL BEARING.

No. 259,255. Patented June 6, 1882.

WITNESSES
Villette Anderson.
Philip C. Mason.

INVENTOR
Geo. W. Williams,
by Anderson & Smith
his ATTORNEYS

United States Patent Office.

GEORGE W. WILLIAMS, OF WINONA, MINNESOTA, ASSIGNOR OF ONE-FOURTH TO WILLIAM E. SMITH, OF SAME PLACE.

JOURNAL-BEARING.

SPECIFICATION forming part of Letters Patent No. 259,255, dated June 6, 1882.

Application filed April 20, 1882. (No model.)

*To all whom it may concern:*

Be it known that I, GEORGE W. WILLIAMS, a citizen of the United States, and a resident of Winona, in the county of Winona and State of Minnesota, have invented a new and valuable Improvement in Journal-Bearings; and I do hereby declare that the following is a full, clear, and exact description of the construction and operation of the same, reference being had to the annexed drawings, making a part of this specification, and to the letters and figures of reference marked thereon.

Figure 1:
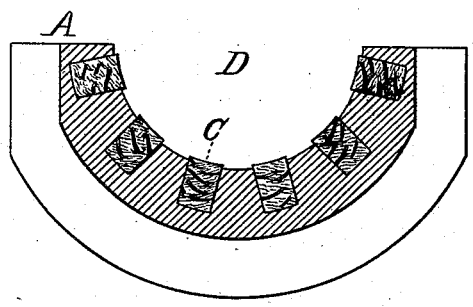
Figure 2:
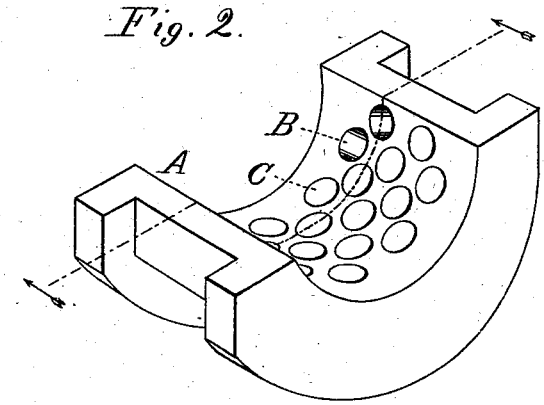
Figure 3:
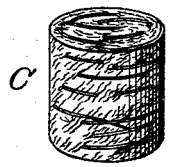

Figure 1 of the drawings is a representation of a section of the journal-bearing. Fig. 2 is a perspective view. Fig. 3 is a perspective view of the pressed wire and asbestus filling.

This invention has relation to journal-bearings; and it consists in providing the metallic body of the bearing with a compactly-pressed asbestus filling, forming the bearing-surface, all as hereinafter set forth.

The object of this invention is to provide a durable bearing for journals, especially those of car-axles.

In the accompanying drawings, the letter A designates the body of the bearing, which is made of brass or other suitable metal, and is formed with the dovetail recess or recesses in its face, as indicated at B.

C represents the asbestus filling, which is compactly pressed into the recess or recesses B until they are filled, the asbestus being usually a little raised above the metallic wall. The asbestus forms the bearing-surface against which the journal acts, as indicated at D, and it is designed to constitute a surface which will not wear down under the action of the journal, serving to protect the metallic body of the bearing and to prevent it from being raised by the friction to a high temperature.

In preparing the filling-plugs several strands of asbestus are wound about with small wire, preferably of copper. These strands are then bound together and wound about with the wire, and the whole is subjected in a press to a pressure of from thirty to forty tons to the square inch. In this manner the plugs or fillings are made very hard and firm, the wire serving to interlace the fibrous mass and preserve its form.

An asbestus packing is not broadly claimed herein, as asbestus has been used for such purposes prior to my invention.

Having described this invention, what I claim, and desire to secure by Letters Patent, is—

1. A journal-bearing consisting of a metallic body portion, A, having the face recess or recesses B, and the asbestus filling C, compactly pressed into said recess or recesses and forming the bearing-surface D, substantially as specified.

2. A journal-bearing consisting of a recessed body portion and compressed asbestus and wire fillings, substantially as specified.

In testimony that I claim the above I have hereunto subscribed my name in the presence of two witnesses.

GEORGE W. WILLIAMS.

Witnesses:
J. N. MAYBURY,
AUSTIN W. LORD.